United States Patent Office 2,709,834
Patented June 7, 1955

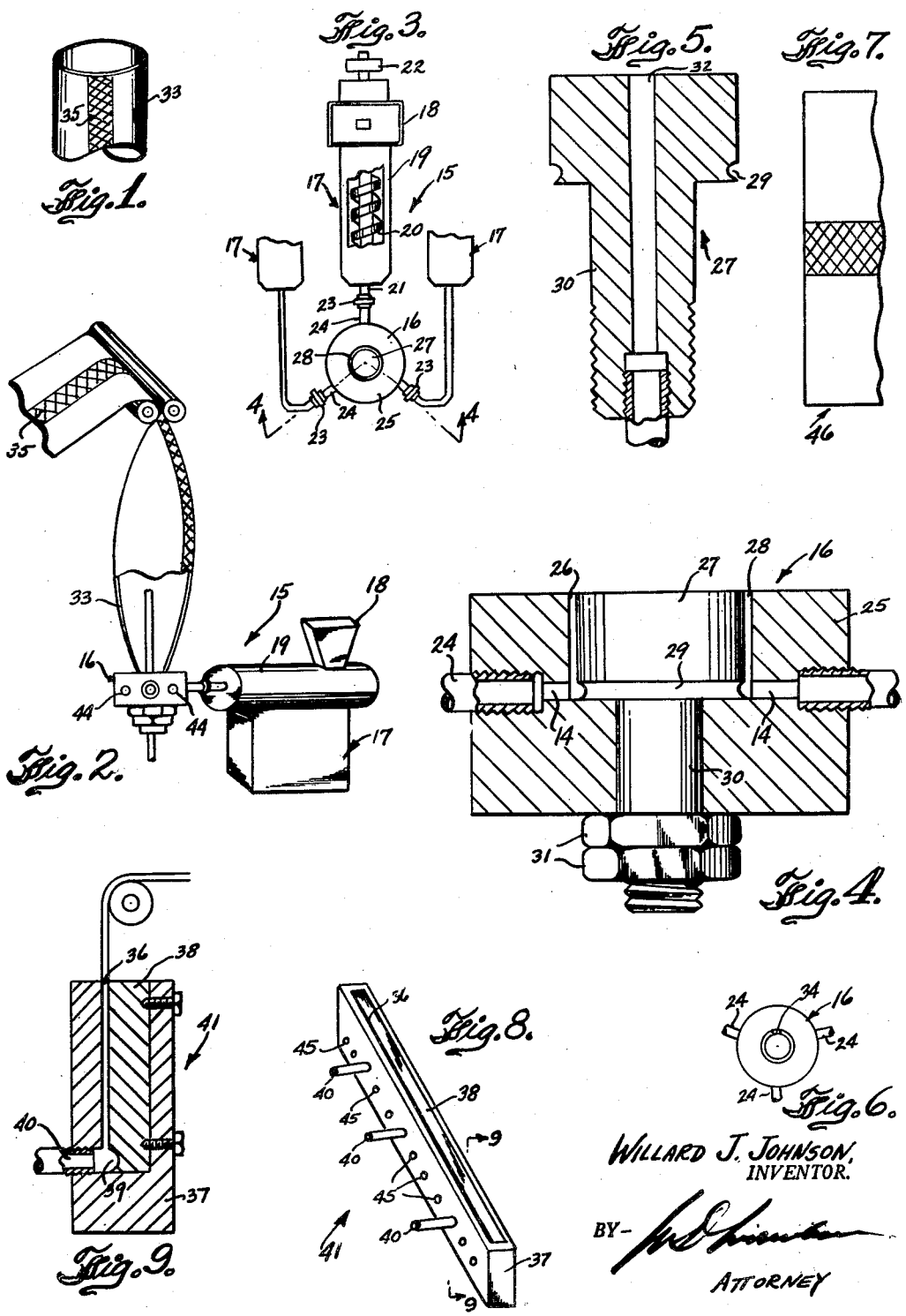

2,709,834

MEANS FOR MAKING LONGITUDINALLY-STRIPED EXTRUSIONS OF PLASTICIZED MATERIAL

Willard J. Johnson, Midland, N. J., assignor of one-third to Louis Danenberg and one-third to Alex Danenberg, both of Long Island City, N. Y.

Application December 12, 1951, Serial No. 261,281

2 Claims. (Cl. 18—12)

The present invention relates to means for the extrusion of plastic tubular forms.

An object of this invention is to provide a novel and improved die for the extrusion of plastic tubes which have longitudinal lanes of different color, different transparency, or both.

Another object hereof is to provide a die of the character mentioned, of novel and improved construction, from whose orifice the tube is discharged in complete tubular form; the joining of all lanes being automatically effected within the die in a novel and positive manner afforded by the die structure, so that the discharged tube is homogeneous and without seams.

A further object of this invention is to provide a novel and improved means for the extrusion of plastic tubular forms of comparatively large cross-sectional dimension by means of a special die, of novel, simple and really cheap construction which utilizes a number of small extruders on hand in most shops, rather than requiring the employment of one large extruder which is expensive and for which the shop owner may have but little use of in his general business.

Another object hereof is to provide a novel and improved die for the extrusion of plastic tubing of any cross-sectional size and shape and of any wall thickness, whether paper-thin for bag manufacture or thick-walled for the manufacture of tubing and piping.

A further object of this invention is to provide a novel and improved machine for the extrusion of plastic tubing which has longitudinal lanes of different character as mentioned, affording proper and easy control of the flow of plastic materials so that they may be fed to the die in proper proportions to attain the required product.

Another object hereof is to provide a die of novel and improved construction for the extrusion of plastic sheeting having longitudinal lanes of different character.

Still a further object hereof is to provide a novel and improved die for the extrusion of plastic tubing, which affords inflation of the extruded tube without interference of the flow of plastic material through such die by any piping used to convey the inflating medium into the extruded tube.

A further object of this invention is to provide novel and improved means of the type set forth which is easy and reasonably cheap to make, simple to use and efficient in carrying out the purposes for which it is designed.

Other objects and advantages will become apparent as this disclosure proceeds.

In the accompanying drawings forming part of this application, similar characters of reference indicate corresponding parts in all the views.

Fig. 1 is a perspective view of a length of plastic tubing having a longitudinal lane different in color or transparency than the remainder of the tube body.

Fig. 2 is a perspective view of a machine embodying the teachings of this invention for making such tubing. Only one of the extruders is shown here, although three are intended in this illustration, one such extruder to feed into each intake port of the die.

Fig. 3 is a top plan view of Fig. 2, with certain of the parts omitted to attain clarity of illustration.

Fig. 4 is a section through the die; such section being taken at lines 4—4 in Fig. 3.

Fig. 5 is a central longitudinal section of one of the die components. This view is of slightly modified construction in that it includes a duct for the passage of a medium to inflate and thus stretch the extruded tube to a larger diameter. Such stretching operation is of the practices known in this art, and is of course omitted when the extruded tube is of the desired diameter.

Fig. 6 is a top plan view of the die of slightly modified form so that the extrusion be a slitted tube, which if of flexible material, makes sheeting.

Fig. 7 shows the face of a length of plastic sheeting having a longitudinal lane different in color or transparency than the remainder of the sheet.

Fig. 8 shows a die embodying the teachings of this invention, for the extrusion of such sheet material.

Fig. 9 is an enlarged section taken through said die at lines 9—9 in Fig. 8.

In the drawings, the machine shown in Figs. 2 and 3, is designated generally by the numeral 15. Such machine in the embodiment illustrated, comprises three extruders of material plasticized therein, which they respectively feed into the die denoted generally by the numeral 16. Said extruders 17, only one of which is shown, though three are intended, are of the usual type where stuff to be plasticized, is fed from the hopper 18 into a heated cylinder 19, where it is led by a revolving conveyor screw 20 and finally ejected in plasticized state into the discharge pipe 21 and thence into an intake port 14 of the die 16. Each conveyor screw 20 is belt-chain or gear-driven at 22. As shown, the discharge pipe of each extruder is respectively coupled by a union 23 to an intake pipe 24 communicative with an intake port 14 respectively.

The die 16 consists essentially of a block 25 having a well 26. In this well is concentrically spaced and secured the plug 27, which rests on the bottom of the well and extends to the mouth of said well 26. It is evident that an annular space 28 is formed between the side walls of the plug and well. The intake ports 14 of the die 16, are so positioned that they discharge directly into an annular channel 29 around the very base of the side wall of the plug 27. This channel 29 may be formed in any suitable manner, but I recommend that it be wholly formed in the plug, as is shown in Figs. 4 and 5. Said plug 27 is secured, as for instance by having an integral shank 30 extending downwardly therefrom through a suitable hole in the block 25. This shank as a matter of example, may be force-fitted into such hole, or threaded to receive the retaining nuts 31. A longitudinal duct 32 is provided in the plug 27, if it is desired to apply a pressure within the extruded tube to force the same to stretch to a predetermined diameter as shown in Fig. 3.

It is to be noted that for the extrusion of tubing 33 of circular cross-section, the die 16 is easily made by simple lathe and drill press operations principally, because the well 26 and the plug 27 are each cylindrical. It is evident that the plug diameter determines the inside diameter of the tubing 33 and the well diameter determines the outside diameter of such tubing. The channel 29 around the base of the plug 27, is also easily made in the lathe. The width of this channel should be substantially equal to the diameter of an intake port 14 of the die 16, and its cross-section is preferably semicircular as shown. If the extruded tubing is to be other than circular in cross-section, the die parts are made to suit as is well known in tool making.

It is preferred that the intake ports 14, lead plastic material from the extruders 17, into the channel 29, in a direction transverse the longitudinal axis of the extruded tubing. For best results, I make such direction perpendicular to such mentioned axis. The flow of plastic material from the extruders enters said channel 29 before extrusion from the mouth of the die 16. This insures continuous and proper abutment merging of the several flows of plastic material fed simultaneously into the die to accomplish an extruded tubing without longitudinal openings. Further, the stuff fed by one of the extruders, or by more than one of them, may be of nature to yield plastic material different in color or transparency than the remaining extruders. The tubing extruded by such an arrangement would be longitudinally striped. The width of the different lanes may be varied by change of the relative speeds of the several conveyor screws of the extruders. Increase of speed of one of the extruders with attending decrease in speed of the others, would widen the longitudinal lane effected by the first extruder. Opposite manner of adjustment, would narrow the lane effected by said first extruder.

For example, if the extruded tubing's wall is paper thin and is to be used for the making of bags or cut into lengths for packaging purposes, the tubing may be translucent or opaque, except for a longitudinal lane which is transparent. Another example would be that the tubing be principally of a light color, translucent or opaque, while the longitudinal lane 35 is a dark color of no or any desired transparency, on which lane it is intended to print say in gold, the trade mark or any legend relating to the merchandise packed. It is evident that by using a required number of extruders furnishing different plastic flows into the die, striped tubing of any desired character may be manufactured.

During any run, each extruder maintains a constant flow of predetermined quantity, and as mentioned adjustments are first made in conveyor screw speeds respectively to effect the striping of required dimensions. It is evident that if the several conveyor screws of the extruders are run at constantly varying speeds, longitudinal lanes of varying design can be effected.

If all, or any part of the extruded tubing is to be of the same character, a plurality of small extruders may be arranged to feed successive intake ports 14 of the die, rather than use a single extruder of comparatively large size, which latter is very costly and would find little use in a shop handling smaller jobs.

If the product desired is sheeting of paper-like nature, a plug 34 is fitted at the proper point, to bridge the annular space 28. This plug 34 extends from the mouth of the die 16 preferably to the base of the well 26 in the block 25.

The teachings of this invention may also be applied for the extrusion of striped sheeting, where the die mouth 36 is longitudinal as shown in Figs. 8 and 9. The die here is of very simple and inexpensive construction. An outer elongated member 37 forms a well wherein is secured the elongated bar 38 to form only the space 39 between them which determines the sheeting to be extruded therefrom, as to dimensions of width and thickness of web. The bar 38 rests at the bottom of the well. Along the very bottom edge of said bar 38, is a channel 39. The intake ports 40 of this die 41, discharge directly into such channel 39. Each such intake port is connected to an extruder as was explained for the die 16. The manner of operation is evident in view of what was said for the die 16. In reality, both dies 16 and 41 are the same in principle. The only difference in the scheme of structure is that in die 16, the discharge orifice is along a circle, while in the die 41, the discharge orifice is along a straight line.

To use a single die for the accomplishment of different striping, a plurality of closely spaced intake ports can be provided; those intake ports not being used at any particular time, are closed by removable plugs shown at 44 and 45 in the dies 16 and 41 respectively.

This invention is capable of numerous forms and various applications without departing from the essential features herein disclosed. It is therefore intended and desired that the embodiments shown herein shall be deemed illustrative and not restrictive and that the patent shall cover all patentable novelty herein set forth; reference being had to the following claims rather than to the specific descriptions herein to indicate the scope of this invention.

I claim:

1. In a die for extruding plasticized material, a body presenting a discharge orifice formed by walls extending from a floor, including a pair of spaced opposite walls ending at said orifice and determining a space between them for the passage of material to be extruded through said die; one wall of said opposite walls having a channel therein communicative with the space between said opposite walls and extending substantially along the entire length of the discharge orifice of the die spaced from said orifice; said body being provided with a plurality of spaced intake ports through the other of said pair of opposite walls, communicative with said space between said opposite walls and opening into said space opposite said channel to direct material fed through them to enter into said channel.

2. The die as defined in claim 1, wherein the channel is along the floor and said intake ports are positioned to direct material along said floor.

References Cited in the file of this patent

UNITED STATES PATENTS

| | | |
|---|---|---|
| 2,161,908 | Becker | June 13, 1939 |
| 2,174,779 | Delorme | Oct. 3, 1939 |
| 2,216,832 | Royle | Oct. 8, 1940 |
| 2,592,658 | Colombo | Apr. 15, 1952 |
| 2,624,914 | Rhodes | Jan. 13, 1953 |